United States Patent [19]

Plasko

[11] 3,936,702
[45] Feb. 3, 1976

[54] ELECTRICAL PROTECTION MEANS
[75] Inventor: Emil Robert Plasko, Washington Township, Ohio
[73] Assignee: Micro Devices Corporation, Dayton, Ohio
[22] Filed: Jan. 8, 1973
[21] Appl. No.: 321,752

Related U.S. Application Data
[63] Continuation-in-part of Ser. No. 229,120, Feb. 24, 1972, abandoned.

[52] U.S. Cl............. 317/40 A; 317/33 SC; 317/16; 219/511
[51] Int. Cl.² ......................................... H01H 83/00
[58] Field of Search......... 307/117; 317/40 R, 40 A, 317/45, 335 C, 12 B; 219/501, 514, 517, 519, 511

[56] References Cited
UNITED STATES PATENTS

| | | | |
|---|---|---|---|
| 2,850,610 | 9/1958 | Kasuga | 219/509 X |
| 2,930,959 | 3/1960 | Slocum | 317/13 B X |
| 3,018,356 | 1/1962 | Busch et al. | 317/41 |
| 3,086,999 | 4/1963 | Kramer | 219/519 |
| 3,377,462 | 4/1968 | Pferschy | 219/213 |
| 3,379,859 | 4/1968 | Marriott | 219/543 X |
| 3,493,815 | 2/1970 | Hurtle | 317/45 X |

Primary Examiner—James R. Scott
Assistant Examiner—William J. Smith
Attorney, Agent, or Firm—Candor, Candor & Tassone

[57] ABSTRACT

An electrical protection unit having a plurality of main leads for respectively interconnecting a plurality of lines of an electrical power source to at least one electrically operated unit. At least one main lead has a device therein for opening the respective lead when the device is activated. The one main lead has one side of an electrical circuit interconnected thereto with the other side of the circuit being adapted to be interconnected to ground, the circuit having means for activating the device when the circuit is operatively interconnected to ground. Control means are provided for operatively interconnecting the circuit to ground.

2 Claims, 7 Drawing Figures

ELECTRICAL PROTECTION MEANS

This application is a continuation-in-part patent application of its copending parent patent application, Serial No. 229,120, now abandoned, Feb. 24, 1972 and is assigned to the same assignee to whom this application is assigned.

This invention relates to an improved electrical control system having protection means therein. This invention also relates to an improved method of protecting such a control system or the like.

It is well known that electrical systems for various appliances and the like are each provided with safety means for terminating the flow of electrical current through such system when adverse situations arise, such as an electrical shorting condition, adverse temperature rise condition, runaway condition, etc.

It is a feature of this invention to provide an improved electrical circuit having means for limiting one or more of the main electrical leads thereof in response to a predetermined condition, such as a time condition, operating condition, failure condition, temperature rise condition, a broken glass-top range cooking surface condition, etc.

Another feature of this invention is to utilize such an electrical circuit in an electrical control system for an appliance or the like.

A further feature of this invention is to provide an improved method of protecting electrical circuits and the like.

In particular, one embodiment of this invention provides a plurality of main leads so constructed and arranged that the same are adapted to respectively interconnect a plurality of lines of an electrical power source to at least one electrically operated unit, such as the electrically operated heating means of a cooking apparatus or the like, to place that device across the lines of the power source. At least one main lead has a device therein for opening the respective lead when that device is activated. The one main lead has one side of an electrical circuit interconnected thereto with the other side of the circuit being adapted to be operatively interconnected to ground, the circuit having means therein for activating the device of that respective lead when the circuit is interconnected to ground. Control means are provided for operatively interconnecting the circuit to ground so that the control means can cause the device to open the one main lead.

For example, when all of the main leads have such devices therein, the interconnecting means can comprise a plurality of rectifiers respectively interconnecting the main leads to an anode of an SCR that has its cathode interconnected to ground and is rendered conductive when the control means introduces a current into the gate of the SCR of a given minimum value so that current can flow through the circuit to operate the means thereof for thermally activating the devices. Such means of the circuit can comprise heater means and the devices can comprise thermally responsive devices that open when heated by the heater means to a certain degree. Alternately, such means of the circuit can comprise relay coil means and the devices can comprise relay switch means that open when such relay coil means is energized.

Accordingly, it is an object of this invention to provide an electrical circuit means having one or more of the novel features set forth above or hereinafter shown or described.

Another object of this invention is to provide a method of operating such an electrical circuit means.

Other objects, uses and advantages of this invention are apparent from a reading of this description which proceeds with reference to the accompanying drawings forming a part thereof and wherein FIG. 1 is a schematic view illustrating the improved electrical control system of this invention.

Figures 1, 2, 3, 4:
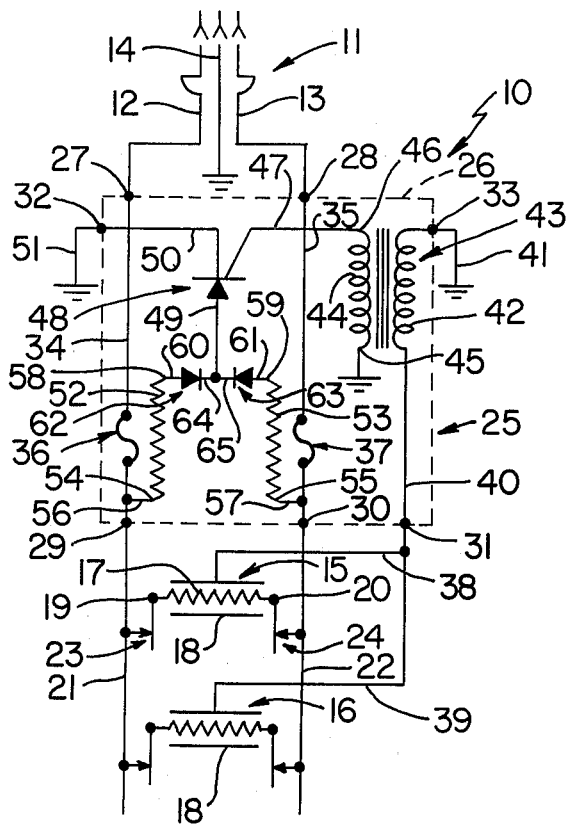
FIG. 2 is a view similar to FIG. 1 and illustrates another embodiment of the electrical control system of this invention.
FIG. 3 is a partial view similar to FIG. 2 illustrating another embodiment of the electrical control system of this invention.
FIG. 4 is a view similar to FIG. 1 and illustrates another embodiment of the electrical control system of this invention.

While the various features of this invention are hereinafter described and illustrated as being particularly adapted for providing protection for electrical control systems for a cooking apparatus, it is to be understood that the various features of this invention can be utilized singly or in any combination thereof to provide electrical circuit protection means for any desired apparatus or structure.

Therefore, this invention is not to be limited to only the embodiments illustrated in the drawings, because the drawings are merely utilized to illustrate some of the wide variety of uses of this invention.

Referring now to FIG. 1, an improved control system of this invention is generally indicated by the reference numeral 10 and comprises an electrical power source 11 represented by a plug that has two power source leads 12 and 13 and a grounded lead 14 in a conventional manner when the same is plugged into an electrical outlet for furnishing current to an appliance or the like, such as a cooking apparatus which in the embodiment of FIG. 1 has a plurality of surface, electrically operated heating devices 15 and 16.

As is well known in the art, each surface heating unit 15 or 16 includes an electrically operated heating element 17 which generates heat when electrical current flows through the same, such heating element 17 being carried within an outer metallic sheath 18 that is electrically insulated from the heating element 17 by suitable insulating material and which normally supports the cooking utensil that is to be heated by the device 15 or 16. The opposed sides 19 and 20 of the heating element 17 are respectively adapted to be electrically interconnected to power leads 21 and 22 by conventional on-off switches 23 and 24 which are illustrated in their closed position in FIG. 1 for electrically interconnecting the leads 21 and 22 to the heating elements 17 of the surface heating units 15 and 16. However, when the selector knob for the particular heating unit 15 or 16 is turned to the "off" position, such selector knob opens the switches 23 and 24 for that unit 15 or 16 in a manner well known in the art to disconnect the particular heating element 17 from the power leads 21 and 22.

The power source 11 is adapted to be electrically interconnected to the power leads 21 and 22 for the heating units 15 and 16 by the electrical circuit means of this invention that is generally indicated by the reference numeral 25 and could be packaged into a self-contained unit 26 indicated by dashed lines in FIG. 1, if desired, by providing a plurality of terminals 27, 28, 29, 30 and 31 as well as one or more terminals for leading to ground as will be apparent hereinafter and in the embodiment illustrated in FIG. 1 comprises terminals 32 and 33.

The terminals 27 and 28 are adapted to be respectively interconnected to the power source leads 12 and 13 in any suitable manner and be electrically interconnected to the terminals 29 and 30 by main leads 34 and 35 respectively having thermally responsive devices 36 and 37 therein, the thermally responsive devices 36 and 37 being of the type that will open the leads 34 and 35 with the same are heated to a certain condition for a certain amount of time with such devices 36 and 37 either being of the thermally responsive fuse type which must be replaced when blown or being of a thermostatically controlled type that must be manually or automatically reset when opened so that same need not be replaced.

For example, when the devices 36 and 37 are to be of the thermally responsive fuse type, the same could be of the form disclosed and claimed in the U.S. Pats. to Merrill, Nos. 3,180,958 and 3,519,972.

The terminals 29 and 30 at the lower ends of the main leads 34 and 35 are adapted to be respectively interconnected to the power leads 21 and 22 for the heating elements 15 and 16 as illustrated The outer metallic sheaths 18 for the heating elements 15 and 16 are respectively adapted to be interconnected to the terminal 31 by leads 38 and 39, the terminal 31 being located at one end of a lead 40 that has its other end interconnected to the terminal 33 for being interconnected to ground by a lead 41 in any conventional manner such as to the frame of the cooking apparatus, so that the sheaths 18 of the units 15 and 16 are always directly interconnected to ground by the circuit means 25 of this invention. It is well known that the circuit means that interconnects the sheaths 18 to ground can consume no more than 0.5 ohms as required by present codes for the grounding of the metallic sheaths for electrically operated surface units of domestic cooking apparatus and the like. However, it is believed that by utilizing a certain size wire for the interconnection between the sheaths 18 and the ground lead 41, the circuit means 25 of this invention for grounding the sheaths 18 of the units 15 and 16 will consume only 0.05 of an ohm so as to be well below the required code rating therefor.

The grounding lead 40 of the circuit means 25 of this invention is coiled between its ends to provide a primary coil 42 of a transformer 43 that has a secondary coil 44 that is provided with opposed ends 45 and 46 with the end 45 leading to ground and the end 46 leading by a lead 47 to the gate of an SCR (silicone control rectifier) generally indicated by the reference numeral 48 with the understanding being that the SCR 48 could be any other desired type of switch that will be under the control of the transformer 43 or other control means in a manner and for a purpose hereinafter described.

However, in the embodiment of the control circuit 10 illustrated in FIG. 1, the control unit or transformer 43 is such that should a current flow through the line 40 to ground because of a shortage or leakage of current from one or more of the heating elements 17 of the units 15 and 16 to the respective sheaths 18 thereof, such flow of current passing through the primary coil 42 of the lead 40 will cause a sufficient flow of current through the secondary coil 44 of the transformer 43 to cause the gate of the SCR 48 to close and interconnect its input or anode 49 to its output lead or cathode 50. The output lead 50 is interconnected to the terminal 32 of the unit 26 with the terminal 32 being interconnected by a suitable lead 51 to ground for a purpose hereinafter described.

Thus, unless current is flowing through the coil 42 of the transformer 43, the SCR 48 is blocking the input lead 49 from the output lead 50 and it is only when an unsafe shorting condition is existing at one or more of the sheaths 18 of the units 15 and 16 that the transformer or control device 43 will cause the SCR 48 to be conductive and interconnect the input lead 49 to the output lead 50 and, thus, the input lead 49 to ground for a purpose hereinafter described.

The other sides 58 and 59 of the heaters 52 and 53 are respectively interconnected to the input leads or anodes 60 and 61 of a pair of diodes or rectifiers 62 and 63 which respectively have their output leads or cathodes 64 and 65 interconnected to the input lead or anode 49 of the SCR 48. While the devices 62 and 63 are referred to hereinafter as diodes, it is to be understood that any suitable form of rectifier can be utilized for interconnecting the sides 58 and 59 of the heaters 52 and 53 to the input lead 49 of the DC switch 48, as desired, as the purpose of the diodes 62 and 63 is to block the current from flowing back and forth through the heaters 52 and 53 because of the sides 58 and 59 of the heaters 52 and 53 being interconnected together.

From the above, it can be seen that the circuit means 25 of this invention can be formed in a relatively inexpensive manner from relatively few parts to operate in a manner now to be described.

When the plug containing the power source 11 for the control system 10 is plugged into an electrical outlet so that the power source leads 12 and 13 are adapted to have current passing through the same, the operator can utilize one or both surface units 15 and 16 by merely causing the switches 23 and 24 thereof to be moved to the closed positions as illustrated in FIG. 1 so that the heating elements 17 can have electrical current flowing to the same because the heating elements 17 are now placed across the power source leads 12 and 13 by the main leads 34 and 35 of the control circuit 25 of this invention. As long as no current leaks or shorts from the elements 17 to the sheaths 18 of the operating units 15 and 16, no current is flowing through the lead 40 of the circuit 25 of this invention and, thus, through the primary winding 42 of the transformer 43. Thus, no current is induced in the secondary coil 44 and, thus, directed by the lead 47 to the SCR 48. In this manner, the input lead 49 of the SCR 48 is not interconnected to the grounded lead 50 so that no current can pass through the electrical heaters 52 and 53 for the thermally responsive devices 36 and 37 whereby the thermally responsive devices 36 and 37 maintain the main leads 34 and 35 in the closed condition illustrated in FIG. 1.

However, should either or both heating elements 17 for the surface units 15 and 16 leak current to the respective sheaths 18 so that such current is directed to ground through the lead 40 of the circuit 25, such flow of current through the coil 42 of the lead 40 causes the transformer 43 to induce a current flow in the coil 44 and, thus, through the lead 47 to operate the SCR 48 in such a manner that the same now interconnects the input lead 49 thereof to the grounded lead 50 so that current can now flow through the heaters 52 and 53 respectively from the leads 34 and 35 to ground. Should the current flow through the heaters 52 and 53 continue through a predetermined time period, the heaters 52 and 53 will cause the thermally responsive devices 36 and 37 to operate or be activated and, thus, open the leads 34 and 35 so that the power source leads 12 and 13 will no longer be interconnected to the heating elements 17 of the surface elements 15 and 16. If the thermally responsive devices 36 and 37 are thermally responsive fuses that blow when activated in the above manner, then in order for the control system 10 to again become operative, new thermally responsive devices 36 and 37 must replace the blown devices 36 and 37. However, if the thermally responsive devices 36 and 37 are merely of the thermostatically operated kind that can be reset once the same have been opened by sensing a certain temperature, then the devices 36 and 37 must be subsequently reset before the units 15 and 16 can be rendered operative.

In either case, it can be seen that a mere incidental flowing of current through the lead 40 of the circuit means 25 of this invention will not cause the heating elements 52 and 53 to cause the thermally responsive devices 36 and 37 to open the main leads 34 and 35 as it requires a certain length of time for current to be flowing through the lead 40 to cause the devices 36 and 37 will not take place.

Therefore, it can be seen that this invention provides an improved electrical circuit means 25 and method of operating the same.

Another control system of this invention is generally indicated by the reference numeral 10A in FIG. 2 and parts thereof similar to the system 10 previously described are indicated by like reference numerals followed by the reference letter "A".

The control system 10A of FIG. 2 is provided for controlling the operation of the bake and broil electrically operated heating units 66 and 67 of the oven of a cooking apparatus (not shown) wherein the elements 66 and 67 are adapted to be respectively placed across the power leads 21A and 22A by selector knob controlled switch means 23A and 24A in a manner well known in the art.

The circuit means 25A of this invention being utilized for interconnecting the power source leads 12A and 13A respectively to the power leads 21A and 22A through the main leads 34A and 35A is substantially identical to the circuit means 25 previously described except that in place of the control device 43 being utilized to operate the SCR 48 of the system 10, another control means 68 is provided and has its output lead 69 interconnected to a terminal 70 of the circuit 25A that in turn is interconnected to the SCR 48A by the lead 47A to cause the SCR 48A to interconnect its input lead 49A to the ground lead 50A only when the control means 68 sends a signal through the output lead 69 thereof for a purpose hereinafter described. However, it can be seen that the circuit means 25A provides the thermal limiters 36A and 37A for the main leads 34A and 35A to cause opening of the main leads 34A and 35A only when current is permitted to flow through the heater means 52A and 53A by the SCR 48A interconnecting the input lead 49A to the ground lead 50A.

The control means 68 has a device 71 for sensing the normal cooking temperature for the oven containing the heater 66 and 67 so that when the temperature in the oven exceeds a high safe cooking temperature limit such as would occur during a "runaway" bake heating condition therein, the device 71 will send an electrical current through its output lead 72 which if permitted to reach the lead 69 will cause the SCR 48A to interconnect the input lead 49A to the grounded lead 50A and thereby cause the heaters 52A and 53A to open the thermally responsive devices 36A and 37A to terminate the operation of the heater means 66 and 67 in the same manner as the devices 36 and 37 previously described.

Another temperature responsive device 73 is also provided for the control means 68 to send an output signal through its output lead 74 which leads to the lead 69 when the device 73 senses that the burn-off cleaning temperature produced by the heater means 66 and/or 67 during a burn-off cleaning operation has exceeded a safe high burn-off temperature.

In order to block one of the temperature responsive devices 71 or 73 from the lead 69 of the control means 68, a selector switch 75 can be provided so that during a cooking operation only the temperature responsive device 71 will be permitted to send its signal to the lead 69 should the device 71 sense that a runaway temperature condition has been created in the oven during a normal cooking operation therein. However, when the selector switch 75 is set for a cleaning operation, the same only permits the device 73 to be interconnected to the lead 69 so that should a runaway cleaning temperature operation exist, the device 73 will cause the SCR 48A to interconnect the lead 49A to the ground lead 50A and thereby cause the heaters 52A and 53A to operate and activate the thermally responsive devices 36A and 37A to open the main leads 34A and 35A and, thus, terminate the high burn-off cleaning operation.

Of course, each thermally responsive device 71 and 73 can be directly interconnected to the SCR 48A through a selector switch 34 as illustrated in FIG. 3 wherein the device 71B is interconnected by its lead 72B through a selector switch 76 to a lead 77 that is interconnected to SCR 48B while the thermally responsive device 73B has its lead 74B interconnected by a selector means 78 to a lead 79 that leads to the SCR 48B as illustrated. Of course, more than two devices 71B and 73B can control the SCR 48B if desired in the same manner as illustrated.

Therefore, it can be seen that the control circuit 25A of this invention is adapted to control the normal cooking and burn-off cleaning operations of the heating elements 66 and 67 of an oven of a cooking apparatus or the like in much the same manner that the circuit means 25 protects the top surface units of such cooking apparatus.

While the control system 10 and 10A previously described each has two power source lines that are respectively provided with the thermally responsive devices 36, 37 and 36A, 37A for controlling each line in the manner previously described, it is to be understood that there are certain power source arrangements that will require only one of the power source lines thereof to be protected by a thermally responsive device.

For example, another electrical control system of this invention is generally indicated by the reference numeral 10C in FIG. 4 and parts thereof similar to the system 10 previously described will be indicated by like reference numerals followed by the reference letter "C."

As illustrated in FIG. 4, the power source 11C provided for one or more surface heating units 15C of a cooking apparatus (not shown) can comprise a single phase power source wherein the power source line 13C is current carrying or supplying while the other power source line 12 C will be grounded when the plug 11C is plugged into an outlet that provides the single phase application by having one of the power lines thereof grounded while the other line is "hot."

Thus, the grounded power source lead 12C can be directly interconnected to the switch 23C for one side of the heating element 17C of the surface unit 15C while the other switch 24C is interconnected to the power source line 13C by the electrical circuit means 25C of this invention which includes the main lead 35C having the thermally responsive device 36C therein. The heating element 52C for the thermally responsive device 36C, while having one side 55C thereof interconnected by the lead 57C to the main lead 35C in the manner previously described, has the other side 59C thereof interconnected directly to the input lead 49C of the SCR 48C whereby no diodes are required for the electrical circuit 25C of this invention.

The sheath 18C for the heating element 15C is interconnected to ground by the lead 40C having the primary winding 42C of the control device or transformer 43C therein whereby the SCR 48C is controlled by the secondary winding 44C of the transformer 33C by the lead 47C in the same manner as provided by the SCR 48 previously described.

Thus, as long as no current is shorting or leaking from the operating heating element 17C to the sheath 18C, no current is flowing through the coil 42C of the transformer 43C so that the SCR 48C is blocking the input lead 49C thereof from the grounded output lead 50C whereby no current can flow through the heating element 52C for the thermally responsive device 36C. However, when such leakage to ground occurs through the lead 40C, the current induced in the secondary coil 44C of the control device 43C causes the SCR 48C to interconnect its input lead 49C to its grounded output lead 50C and, thus, cause current to flow through the heating element 52C and thereby activate the thermally responsive device 36C to open the power lead 35C to terminate the operation of the heating element 15C in the manner previously described for the heating elements 15 and 16 of FIG. 1.

Thus, it can be seen that the control system 10C of this invention is adapted to effectively control a circuit that includes a plurality of main leads for respectively interconnecting a plurality of lines of an electrical power source to at least one electrically operated device to place that device across the line of the power source even though one of such lines is, in effect, a grounded line.

Figure 5:
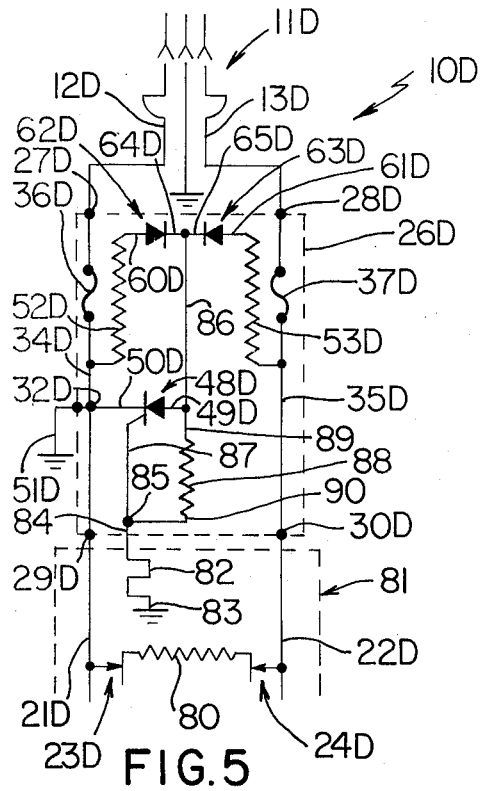
FIG. 5 is a view similar to FIG. 1 and illustrates another embodiment of the electrical control system of this invention.

Another electrical control system of this invention is generally indicated by the reference numeral 10D in FIG. 5 and parts thereof similar to the parts of the system 10 previously described are indicated by like reference numerals followed by the reference letter "D".

The control system 10D of FIG. 5 is particularly adapted to be utilized with a glass or ceramic top range cooking surface to automatically turn off the heating units thereof should such glass top become broken, as will become apparent hereinafter as it has been found that should such glass or ceramic top fracture during use thereof and then water be spilled on the same so that the water could leak through the break and come in contact with the electrically hot current-carrying element that is otherwise protected within a top that is intact, such an arrangement would be an electrical hazard as such spilled water could conduct the electrical current of the heating element to the hand of the user if such broken top were touched under these conditions.

In particular, it can be seen that the electrical control system 10D of this invention comprises the self-contained unit 26D having the fuse devices 36D and 37D respectively in the main lines 34D and 35D respectively leading to the switch means 23D and 24D for the heating element 80 that is embedded in the glass or ceramic top of a cooking range (not shown) with such top being generally indicated by the reference numeral 81 in FIG. 5.

A wire or other conductor 82 of this invention is adapted to be embedded throughout the glass top 81 and be formed in such a manner that the same will readily break along with the glass or ceramic top 81 should the same subsequently become broken, the wire 82 having one end 83 thereof to be grounded as illustrated and having the other end 84 thereof to be interconnected to a terminal 85 of the unit 26D.

The other terminals 29D and 30D of the unit 26D for the main lines 34D and 35D are respectively adapted to be interconnected to the leads 21D and 22D for the heating means 80. Similarly, as in the embodiment of FIG. 1, the terminals 27D and 28D are adapted to be interconnected to the power source lines 12D and 13D of the electrical power source 11D for the reasons previously described. The terminal 32D of the unit 26D interconnects the output or cathode 50D of the SCR 48D to the line 51D that leads to ground, the input or anode 49D of the SCR being interconnected by a lead 86 to the cathodes or outputs 64D and 65D of the diodes 62D and 63D that respectively have their anodes or inputs 60D and 61D interconnected to the heating elements 52D and 53D that are arranged adjacent the safety devices 36D and 37D.

The terminal 85 of the unit 26D that is interconnected to the connector 82 embedded in the glass or ceramic top 81 of the cooking apparatus is interconnected by a lead 87 to the gate of the SCR 48D so that as long as the gate of the SCR 48D is interconnected to ground through the conductor 82, the input 49D of the SCR 48D is not interconnected to the output 50D thereof so that no current can flow through the heating elements 52D and 53D to cause the fuse means 36D and 37D to open the lines 34D and 35D in the manner previously described.

However, if during the operation of the heating means 80 of the cooking top 81 wherein the switch means 23D and 24D are interconnecting the lines 21D and 22D to the heating means 80, should the glass top 81 become broken and thereby cause a hazardous electrical condition as previously set forth, such break in the top 81 will also break the conductor 82 so that the terminal 85 and, thus, the gate of the SCR 48D is no longer interconnected to ground whereby normal leakage currents in the gate of the SCR 48D, which would normally be directed to ground through the conductor 82, are believed to be enough to turn the SCR 48D "on" or cause it to be conductive and thereby interconnect its input 49D to its output 50D. With the SCR 48D now being conductive, the SCR 48D causes current to flow through the heating means 52D and 53D in the manner previously described and thereby cause the fuse devices 36D and 37D to blow and open the lines 34D and 35D whereby further current flow to the heating means 80 is prevented by the circuit means 10D until the safety devices 36D and 37D are replaced. Of course, since the glass top 81 has been fractured to cause the blowing of the safety devices 36D and 37D, a new glass top arrangement 81 must be provided for the cooking apparatus.

While it has been previously described that it is believed that the mere breaking of the conductor 82 through the breaking of the glass top 81 will cause the SCR 48D to become conducting through the normal leakage currents in the gate thereof, if desired, a resistor 88 can have one end 89 interconnected to the line 86 and, thus, to the input 49D of the SCR 48D and have its other end 90 interconnected to the terminal 85 and, thus, to the line 87 leading to the gate of the SCR 48D to assure that a turn-on condition of the SCR 48D will occur when the conductor 82 is broken and, thus, disconnect the gate of the SCR 48D from ground.

Therefore, it can be seen that the teachings of this invention can be utilized in the manner illustrated in FIG. 5 to protect the glass or ceramic top 81 of the cooking apparatus should the same become broken and thereby prevent the same from forming a hazardous electrical condition because the system 10D of this invention is sensitive to such breaking of the top 81 and will cause a termination of the flow of current to the heating means 80 for the heating top 81 in the manner previously described.

While the system 10D has been described and illustrated as being for a three-line system power source 11D, it is to be understood that the same could be provided for a two-line system in much the same manner as illustrated in FIG. 4 wherein only the hot line would be provided with the safety device as previously described.

While the various systems of this invention have been described as having the devices in the main lines of the units thereof formed from thermally responsive fuses or devices that open in response to current flowing through electrical heaters disposed adjacent thereto, it is to be understood that the various features of this invention can be utilized with other types of opening devices in the main lines.

For example, such devices could merely be relay switch means for opening and closing such lines.

Figure 6:
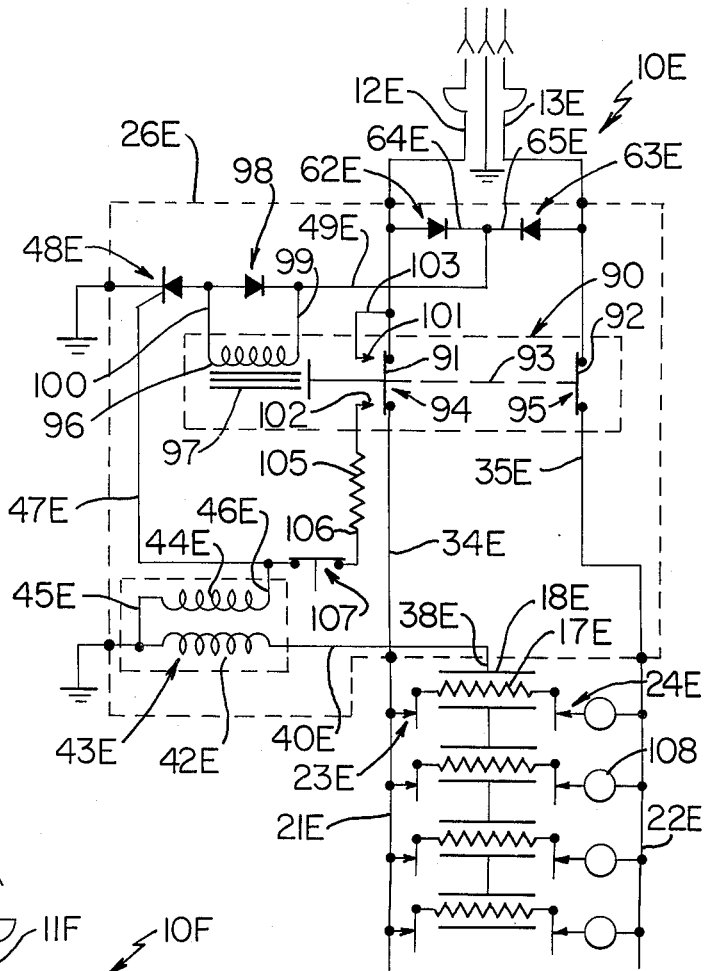
FIG. 6 is a view similar to FIG. 1 and illustrates another embodiment of the electrical control system of this invention.

In particular, another electrical control system of this invention is generally indicated by the reference numeral 10D in FIG. 6 and parts thereof similar to the parts of the other systems of this invention are indicated by like reference numerals followed by the reference letter "E".

As illustrated in FIG. 6, the unit 26E includes the main lines 34E and 35E for respectively being adapted to be interconnected at their upper ends to the power source lines 12E and 13E while being adapted to be interconnected to the lines 21E and 22E at the lower ends thereof, the lines 21E and 22E being adapted to be interconnected by the switch means 23E and 24E to the sheathed heating elements 17E as previously described for the system 10. Also, the sheaths 18E for the heating elements 17E are adapted to be electrically interconnected by a line 38E to the line 40E which leads to the primary coil 42E of the transformer 43E whereby the coil 42E will have current flowing therethrough to ground should one of the heating elements 17E short to its conductive sheath 18E as previously described.

The secondary winding or coil 44E of the transformer 43E has one side 46E thereof interconnected to the line 47E that leads to the gate of the SCR 48E while the other side 45E of the secondary winding 44E is interconnected to ground as illustrated. Thus, when current is induced to flow in the secondary winding 44E of the transformer 43E because current is flowing through the primary winding 42R for reasons previously set forth, the SCR 48E is made conductive in the manner previously described to open the lines 34E and 35E in a manner now to be described.

An electrically operated relay means 90 is provided for the unit 26E and includes a pair of switch elements or bridging members 91 and 92 interconnected together by tying means 93 so as to move in unison and respectively form part of electrical switches 94 and 95 in the lines 34E and 35E for opening and closing the same. The bridging switch members 91 and 92 and tying means 93 therefor are normally disposed in the closed condition illustrated and thereby complete the circuits through the lines 34E and 35E as illustrated. However, the switch members 91 and 92 are adapted to be moved to the open position thereof when a relay coil means 96 for the relay 90 is energized and thereby has current flowing therethrough to attract the armature 97 of the relay 90 and cause the armature 97 to move to the left in FIG. 6 and thereby open the switch members 91 and 92 to terminate the flow of current through the lines 34E and 35E as long as current is flowing through the relay coil 96.

The line 49E leading from the outputs or cathodes 64E and 65E of the diodes 62E and 63E to the anode of the SCR 48E has a flywheel diode 98 disposed therein. The relay coil 96 has one side 99 thereof interconnected to the line 49E in advance of the diode 98 while the other side 100 of the relay coil 96 is interconnected to the line 49E intermediate the SCR 48E and the diode 98 as illustrated.

When the relay 90 is operated by the relay coil 96 having current flowing therethrough in the manner hereinafter described so as to cause the switch blades 91 and 92 to move to an open position thereof, such opened switch blade 91 is adapted to bridge a pair of contacts 101 and 102, as long as current is flowing through the relay coil 96, to thereby interconnect a line 103 that is interconnected to the line 34E upstream of the switch 94 to one side 104 of a resistance means 105 that has the other side 106 thereof interconnected to the lead 47E by a normally closed reset switch means 107, the resistance means 105 providing a holding circuit for the SCR 48E, and being required to limit the SCR gate current to a value consistent with the capabilities of the SCR 48E so that the same will remain conductive as will be apparent hereinafter.

The operation of the control system 10E of this invention will now be described.

As long as no current is flowing through the coil 42E of the transformer 43E, the SCR 48E is nonconducting and thereby current cannot flow through the coil 96 of the relay 90 whereby the normal position of the switch blades 91 and 92 of the relay 90 is in their closed position illustrated in FIG. 6 so that the switches 94 and 95 in the lines 34E and 35E are closed and current can flow from the power source 11E to any of the heating elements 17E of the cooking apparatus (not shown) when the respective switches 23E and 24E are moved to the closed position as illustrated in FIG. 6 by suitable selector means, such as the selector means 108 illustrated in FIG. 6.

However, if during the operation of one or more of the heating elements 17E in the manner previously described, a short should occur between a particular heating element 17E and its conductive sheath 18E, such short circuit causes current to flow through the line 40E to ground and, thus, through the primary coil 42E of the transformer 43E and thereby induce current to flow through the secondary coil 44E of the transformer 43E and thereby cause the gate of the SCR 48E to interconnect its input to its output. Thus, current will now flow through the coil 96 of the relay 90 and thereby move the switch blades 91 and 92 to an open position to the left in FIG. 6 to terminate the flow of current through the lines 34E and 35E of the unit 26E for the reasons previously set forth. However, since the switch blade 91 has opened the switch 94 in the manner previously described, the same is now in a position to bridge the contacts 101 and 102 together whereby it can be seen that current from the line 12E is now directed through the resistance means 105 and line 47E to the gate of the SCR 48E to maintain the same in a conducting condition whereby current will continue to flow through the relay coil 96 and hold the relay 90 in the open position even though once the switch blades 91 and 92 have been moved to the open condition thereof, no more current is being supplied to the heating elements 17E and thereby no more current is shorting through the secondary 42E of the transformer 43E to ground.

Therefore, the operator, in order to reset the system 10E and break the holding circuit for the SCR 48E, must open the reset button 107 to terminate the flow of current through the relay coil 96 and thereby permit the relay 90 to move the switch blades 91 and 92 back to the normally closed position thereof to reset the circuit 10E for subsequent operation of the heating means 17E after the same has been serviced to a safe condition thereof or to use the heating elements 17E that are not defective if the defective element 17E is turned off.

Thus, it can be seen that the system 10E of this invention provides means for detecting any leakage to ground from the heating elements 17E and thereby terminating the operation of such heating element or elements by utilizing relay switch means 94 and 95 in the main lines 34E and 35E rather than the fuse means 36 and 37 previously described.

While the system 10E has been illustrated and described as being for a full wave three-line power source system, it is to be understood that the same could be utilized as a half-wave means system in much the same manner as the system 10E previously described.

Figure 7:
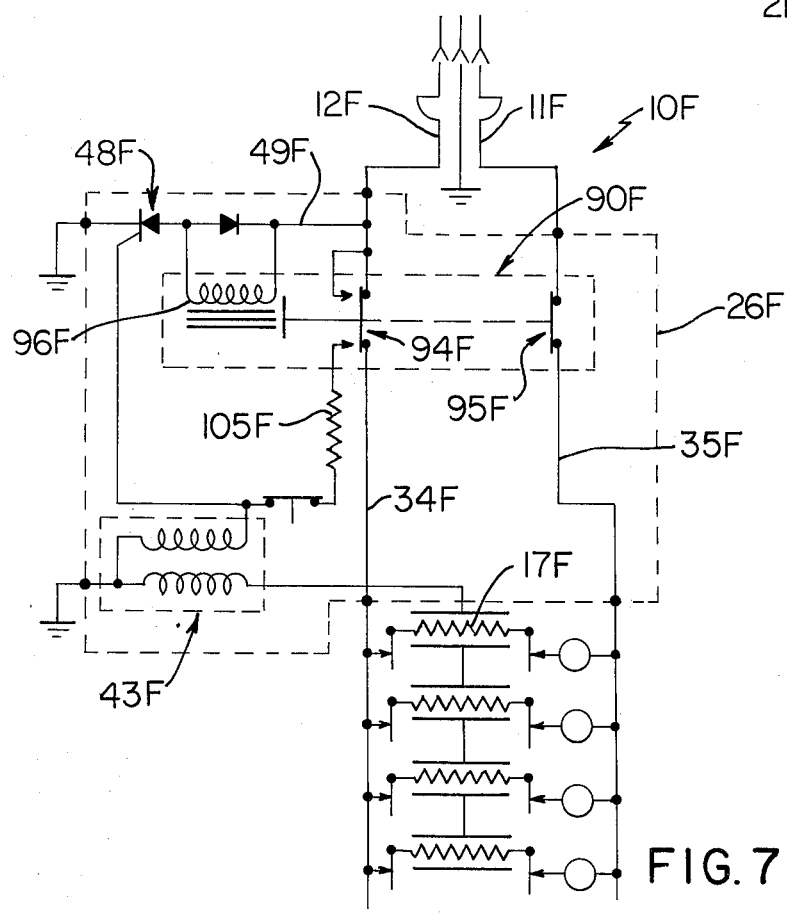
FIG. 7 is a view similar to FIG. 1 and illustrates another embodiment of the electrical control system of this invention.

For example, reference is now made to FIG. 7 wherein another control system of this invention is generally indicated by the reference numeral 10F and parts thereof similar to the parts of the systems previously described are indicated by like reference numerals followed by the reference letter "F".

As illustrated in FIg. 7, the unit 26F has both the relay 90F and the transformer 43F therein for opening the lines 34F and 35F in the same manner as the relay 90 and transformer 43E of the system 10E except that the line 49F forming the anode of the SCR 48F is directly interconnected to the line 34F in advance of the switch 94F and is not interconnected to the line 35F. However, the relay coil 96F operates the relay 90 in the same manner to open the switches 94F and 95F when the SCR 48F is rendered conductive by the transformer 43F detecting a leakage to ground of a heating element 17F except that the relay 90F operates on a half-wave principle wherein the current in the line 12F will operate the relay coil 96F through the holding circuit 105F in substantially the same manner as the diode arrangement of FIG. 6.

Also, it is to be understood that should the power source 11F be only a two-line power source wherein the line 13F is grounded and the line 12F is the hot line thereof, the switch 95F of the relay 90F could be eliminated from the line 35F and only the switch 94F need be provided for opening and closing the hot line 34F in much the same manner as system 10C of FIG. 4 previously described.

Therefore, it can be seen that the various electrical control means of this invention each provides means for protecting the electrical circuit in response to a predetermined condition being sensed by the control means thereof.

While the form of the invention now preferred has been disclosed as required by the Patent Statute, other forms may be utilized, all coming within the scope of the appended claims.

What is claimed is:

1. In combination, a ground lead, a pair of main leads for interconnecting an electrical power source to at least one electrically operated unit, each main lead having a thermally activated device therein for opening the respective main lead when said device is activated, said main leads being respectively interconnected to a pair of branch leads respectively having a pair of electrically operated heating means therein for respectively activating said devices when said branch leads are operatively interconnected to ground, and control means for substantially simultaneously interconnecting said branch leads to said ground lead, said control means being condition responsive so as to operatively interconnect said branch leads to said ground lead only when sensing a predetermined condition, said condition responsive means being adapted to be responsive to a broken glass-top range cooking surface.

2. In combination, a ground lead, a pair of main leads for interconnecting an electrical power source to at least one electrically operated unit, each main lead having a thermally activated device therein for opening the respective main lead when said device is activated, said main leads being respectively interconnected to a pair of branch leads respectively having a pair of electrically operated heating means therein for respectively activating said devices when said branch leads are operatively interconnected to ground, control means for substantially simultaneously interconnecting said branch leads to said ground lead, and an SCR having its anode operatively interconnected to said branch leads, its cathode operatively interconnected to said ground lead and its gate controlled by said control means, said control means comprising a conductor having one end interconnected to said gate of said SCR and its other end adapted to be interconnected to ground whereby said conductor is adapted to cause said SCR to be rendered conductive only when said conductor is broken, said conductor being adapted to be associated with a glass-top range cooking surface so as to be broken should such range top become broken.

* * * * *